(12) United States Patent
Ikeda (10) Patent No.: US 12,032,754 B2
(45) Date of Patent: Jul. 9, 2024

(54) INFORMATION PROCESSING APPARATUS, INFORMATION PROCESSING METHOD, AND NON-TRANSITORY COMPUTER READABLE MEDIUM

(71) Applicant: CANON KABUSHIKI KAISHA, Tokyo (JP)

(72) Inventor: Kouji Ikeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/365,319

(22) Filed: Aug. 4, 2023

(65) Prior Publication Data

US 2024/0053832 A1 Feb. 15, 2024

(30) Foreign Application Priority Data

Aug. 12, 2022 (JP) .................................. 2022-128583

(51) Int. Cl.
*G06F 3/0346* (2013.01)

(52) U.S. Cl.
CPC .... *G06F 3/0346* (2013.01); *G06F 2203/0331* (2013.01)

(58) Field of Classification Search
CPC .......... G06F 2203/0331; G06F 3/0346; G09G 3/002
See application file for complete search history.

(56) References Cited

U.S. PATENT DOCUMENTS

| | | | |
|---|---|---|---|
| 8,081,252 B2 * | 12/2011 | Furuya | H04N 21/4184 348/333.12 |
| 9,066,008 B2 * | 6/2015 | Ishitsuka | H04N 23/635 |
| 10,001,844 B2 | 6/2018 | Namba et al. | |
| 10,261,327 B2 | 4/2019 | Nishizawa | |
| 10,657,722 B2 | 5/2020 | Nishizawa | |
| 11,477,433 B2 | 10/2022 | Takahashi et al. | |
| 2017/0083104 A1 | 3/2017 | Namba et al. | |

FOREIGN PATENT DOCUMENTS

| | | |
|---|---|---|
| JP | H08-152972 A | 6/1996 |
| JP | 2017-059062 A | 3/2017 |

* cited by examiner

*Primary Examiner* — Abbas I Abdulselam
(74) *Attorney, Agent, or Firm* — Venable LLP (57) ABSTRACT

An information processing apparatus performs control, in a first control mode, so that a first display item is displayed on a display region of a display unit, the first display item indicating a position based on inertial information of a controller. The information processing apparatus performs control, in a second control mode, so that a second display item is displayed on the display region, the second display item indicating a position according to a first operation performed on a specified operation member in a first area of the display region. The information processing apparatus performs, in a case where the position indicated by the first display item is included in a second area of the display region in the first control mode, switching from the first control mode to the second control mode in response to a specified operation.

16 Claims, 8 Drawing Sheets

INFORMATION PROCESSING APPARATUS, INFORMATION PROCESSING METHOD, AND NON-TRANSITORY COMPUTER READABLE MEDIUM

BACKGROUND OF THE INVENTION

Field of the Invention

The present invention relates to an information processing apparatus, an information processing method, and a non-transitory computer readable medium.

Description of the Related Art

There have been known a mixed reality (MR) technology and a virtual reality (VR) technology each using an HMD (Head Mounted Display) to allow a user to feel a space different from a real space. In such a technology, it has been examined for the user to perform various control on the HMD (Head Mount Display), while wearing the HMD.

Japanese Patent Application Publication No. 2017-059062 discloses an information processing apparatus that recognizes an input device and an operating medium (user's hand) for operating the input device, and switches an application on the basis of a result of the recognition.

Meanwhile, a technology of controlling a display item indicating a position to improve an operability of a user is also examined. Japanese Patent Application Publication No. H08-152972 discloses a technology in which, when a dialog window is displayed, a mouse cursor (display item) is moved to a prescribed position irrespective of a position of the mouse cursor displayed immediately before to improve the operability.

SUMMARY OF THE INVENTION

Meanwhile, from a viewpoint of convenience, a user may like to switchably use a plurality of display items (e.g., a mouse cursor and a selection frame) each indicating a position. However, the technology described above does not assume the user of the plurality of display items, and consequently the plurality of display items each representing the position and highly convenient for the user cannot be controlled.

It is therefore an object of the present invention is to provide a technology of controlling a plurality of display items each representing a position and highly convenient for a user.

An aspect of the invention is an information processing apparatus including: at least one memory and at least one processor which function as: a first display control unit configured to perform control, in a first control mode, so that a first display item is displayed on a display region of a display, the first display item indicating a position based on inertial information of a controller; a second display control unit configured to perform control, in a second control mode, so that a second display item is displayed on the display region, the second display item indicating a position according to a first operation performed on a specified operation member, the position being in a first area of the display region; and a switching unit configured to perform switching from the first control mode to the second control mode in response to a specified operation in a case where the position indicated by the first display item is included in a second area of the display region in the first control mode.

An aspect of the invention is an information processing method, including: a first display control step of performing control, in a first control mode, so that a first display item is displayed on a display region of a display unit, the first display item indicating a position based on inertial information of a controller; a second display control step of performing control, in a second control mode, so that a second display item is display on the display region, the second display item indicating a position according to a first operation performed on a specified operation member, the position being in a first area of the display region; and a switching step of performing switching from the first control mode to the second control mode in response to a specified operation in a case where the position indicated by the first display item is included in a second area of the display region in the first control mode.

Further features of the present invention will become apparent from the following description of exemplary embodiments with reference to the attached drawings.

DESCRIPTION OF THE EMBODIMENTS

Referring to the accompanying drawings, embodiments of the present invention will be described in detail by using an HMD as an example. Note that, in the HMD, e.g., a display range in a 360-degree field of view is present. Accordingly, the HMD allows a user to feel that the display range is extremely largely expanded compared to that of a conventional PC display. As a result, the HMD has an advantage that a large number of displays are simultaneously possible, while a display item (UI) indicating (specifying) a position, such as a mouse cursor or a pointer, is easy to lose sight of when moving out of a line of sight of the user.

First Embodiment

Figure 1:
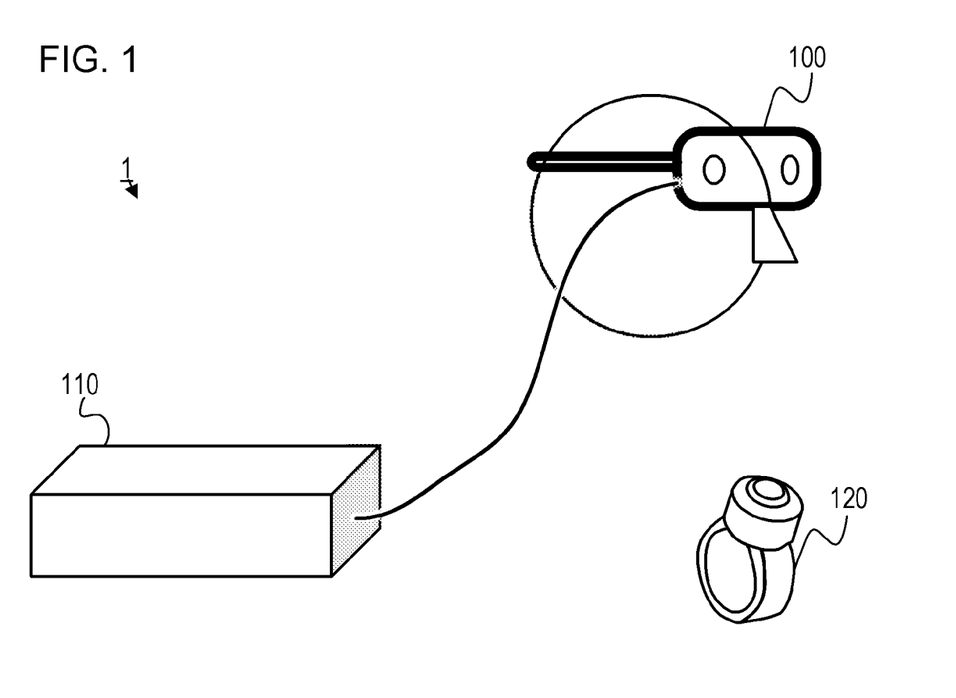
FIG. 1 is a diagram illustrating an information processing system according to a first embodiment.

Referring to FIG. 1, a description will be given of an information processing system 1 according to a first embodiment. The information processing system 1 has an HMD 100, an image processing apparatus 110, and a controller 120.

The HMD 100 is a head-worn display device (display element) that can be worn on a head of the user. The HMD 100 displays a composite image obtained by combining a captured image resulting from image capturing of a range in front of the user performed by HMD 100 with a content such as CG (computer graphics) in a form according to an attitude of the HMD 100.

The image processing apparatus 110 is a control apparatus (information processing apparatus or electronic device) that controls the HMD 100. Exampled of the image processing apparatus 110 is a smartphone, a tablet terminal, and a PC (personal computer). The image processing apparatus 110 is wirelessly or wiredly connected to the HMD 100. The image processing apparatus 110 combines the captured image with a CG to generate the composite image, and transmits the composite image to the HMD 100. Note that each of components of the image processing apparatus 110 may also be included in the HMD 100.

The controller 120 is a device for performing various control of the HMD 100. When the image processing apparatus 110 is in a specified control mode and the user performs an operation on the controller 120, the HMD 100 is controlled according to the operation of the user. As illustrated in FIG. 1, the controller 120 has a finger ring shape (ring shape) to be wearable on a finger of the user. When the controller 120 is wearable on the finger of the user, the user can freely move hands, while holding the controller 120. The controller 120 has a button in which an optical track pad (hereinafter referred to as "OTP") capable of sensing an amount of two-dimensional movement is embedded. The controller 120 performs wireless communication with the image processing apparatus 110 via the Bluetooth (registered trademark).

For example, the user long-presses the OTP button to display a menu including a pointer on the HMD 100. Then, the user places a finger on the OTP and swipes in an optional direction to be able to move the pointer to an intended item. Then, the user presses the OTP button to be able to perform a determining operation, such as to determine selection of the item. It is assumed that the shape of the controller 120 is the finger ring shape, but the shape of the controller 120 is not limited thereto. For example, the shape of the controller 120 may also be a shape wearable on a hand, such as a glove shape. Thus, the controller 120 may appropriately be in a form that can be held with a hand of the user or worn on the hand so as to be user-friendly.

Inner Configuration of HMD

Figure 2:
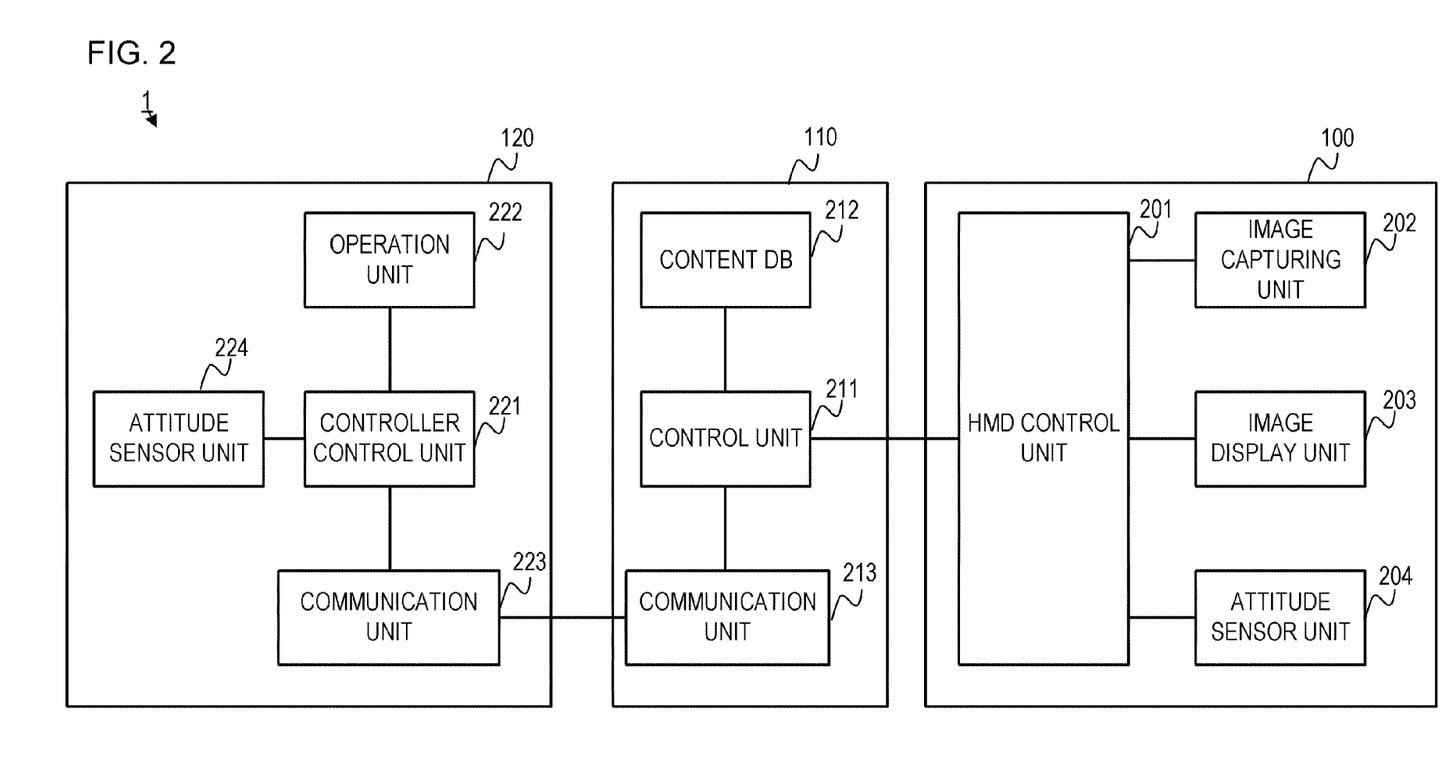
FIG. 2 is an inner configuration diagram of an HMD or the like according to the first embodiment.

Referring to FIG. 2, an inner configuration of the HMD 100 will be described. The HMD 100 has an HMD control unit 201, an image capturing unit 202, an image display unit 203, and an attitude sensor unit 204.

The HMD control unit 201 controls each of components of the HMD 100. When acquiring the composite image (image obtained by combining the captured image resulting from image capturing of a space in front of the user by the image capturing unit 202 with the CG) from the image processing apparatus 110, the HMD control unit 201 displays the composite image on the image display unit 203. Accordingly, by wearing the HMD 100, the user can view the composite image displayed on the image display unit 203. The user can experience various mixed realities such that the CG is merged with a real space.

The image capturing unit 202 includes two cameras (image capturing devices). One of the two cameras is placed close to positions of a left eye of the user while wearing the HMD 100 and another of the two cameras is placed close to a right eye of the user while wearing the HMD 100, so as to capture images of the same space as a space viewed by the user at normal times. The images (captured images) resulting from the image capturing of a subject (range in front of the user) by the two cameras are output to the image processing apparatus 110. The two cameras in the image capturing unit 202 can also acquire information on distances from the two cameras to the subject through distance measurement by a stereo camera, as distance information.

The image display unit 203 displays the composite image. For example, the image display unit 203 has liquid crystal panels, organic EL panels, or the like. In a state where the user is wearing the HMD 100, the organic EL panels are located in front of the respective eyes of the user.

Note that, for the image display unit 203, a device using a semi-transmissive half mirror can also be used. In this case, for example, the image display unit 203 may also use a technology generally referred to as AR to display an image such that the CG is superimposed directly on a real space viewed through the half mirror. Alternatively the image display unit 203 may also use a technology generally referred to as VR to display a complete virtual space image without using the captured image.

The attitude sensor unit 204 detects the attitude and a position of the HMD 100. The attitude sensor unit 204 has an inertial measurement unit (IMU) that acquires inertial information. The attitude sensor unit 204 outputs information on the attitude of the HMD 100 as attitude information to the image processing apparatus 110.

Inner Configuration of Image Processing Apparatus

Referring to FIG. 2, an inner configuration of the image processing apparatus 110 will be described. The image processing apparatus 110 has a control unit 211, a content DB 212, and a communication unit 213.

The control unit 211 (display control unit) receives, from the HMD 100, the image (captured image) acquired by the image capturing unit 202 and the attitude information acquired by the attitude sensor unit 204. The control unit 211 performs, on the captured image, such image processing as to cancel out aberration between an optical system of the image capturing unit 202 and an optical system of the image display unit 203. Then, the control unit 211 combines the captured image with optional CG to generate a composite image. The control unit 211 transmits the composite image to the HMD control unit 201 in the HMD 100.

Note that the control unit 211 controls, on the basis of the information (distance information and attitude information) acquired by the HMD 100, a position of the CG in the composite image, an orientation thereof, and a size thereof. For example, when, in a space represented by the composite image, a virtual object represented by the CG is to be placed near a specified object present in a real space, the control unit 211 sets the size of the virtual object (CG) larger as a distance between the specified object and the image capturing unit 202 is shorter. By thus controlling the position, orientation, and size of the CG, the control unit 211 can generate a composite image such that a CG object that is not placed in the real space looks as if placed in the real space.

The content DB 212 is a storage unit that stores information on the CG and the like. Note that the control unit 211 can switch the CG (i.e., CG to be used to generate the composite image) to be read from the content DB 212.

Inner Configuration of Controller

Referring to FIG. 2, an inner configuration of the controller 120 will be described. The controller 120 has a controller control unit 221, an operation unit 222, a communication unit 223, and an attitude sensor unit 224. It is unnecessary herein for a plurality of light-emitting diodes (such as a large-size sensor) to be mounted in the controller 120. Accordingly, the controller 120 can be reduced in size.

The controller control unit 221 controls each of the components of the controller 120.

The operation unit 222 includes a button in which the OTP (specified operation member) is embedded. Information (operation information) on pressing of the OTP and a finger slide in the operation unit 222 is transmitted to the image processing apparatus 110 via the communication unit 223.

For example, by sliding a finger over the OTP, the user can move the pointer displayed on the HMD 100 to a predetermined position. In addition, by pressing the OTP button, the user can give an instruction for specified processing to each of the HMD 100 and the image processing apparatus 110. By thus combining the finger slide and the pressing of the button in the OTP, the user can control the HMD 100. More specifically, the user can perform control such that, e.g., by long-pressing the OTP button to display a menu on the HMD 100, moving the pointer to an intended place, and then pressing the OTP button, the place is selected.

The operation unit 222 may also include any operation member instead of the OTP as long as the user can perform an operation thereon through physical contact. For example, the operation unit 222 may also include any of a touch-pad, a touch panel, an arrow key, a joystick, and a track pad device instead of the OTP.

The communication unit 223 performs wireless communication with the image processing apparatus 110 (communication unit 213).

The attitude sensor unit 224 has an IMU (inertial measurement device or inertial sensor) capable to detecting, as movement of the user, inertial information (spatial movement or rotary movement) of the controller 120. Note that the attitude sensor unit 224 needs only to be a device which does not inhibit a size reduction of the controller 120 and can detect, as the inertial information, information on the spatial movement (positional variation, speed, and acceleration) or/and the rotary movement (rotation amount, rotation speed, and angular velocity).

Each Control Mode

Figure 4:
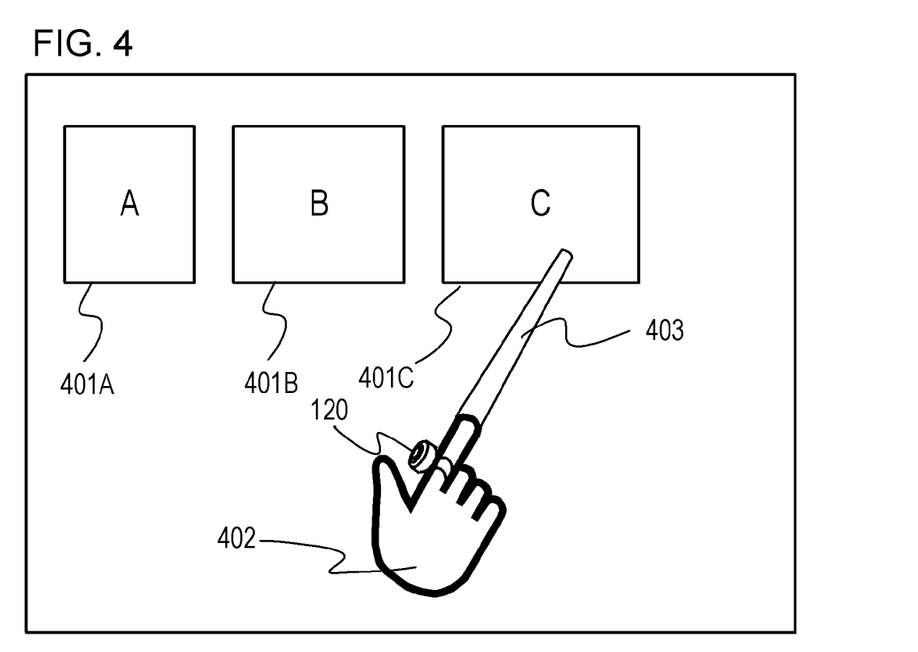
FIG. 4 is a diagram illustrating display of a ray control mode according to the first embodiment.
Figure 5:
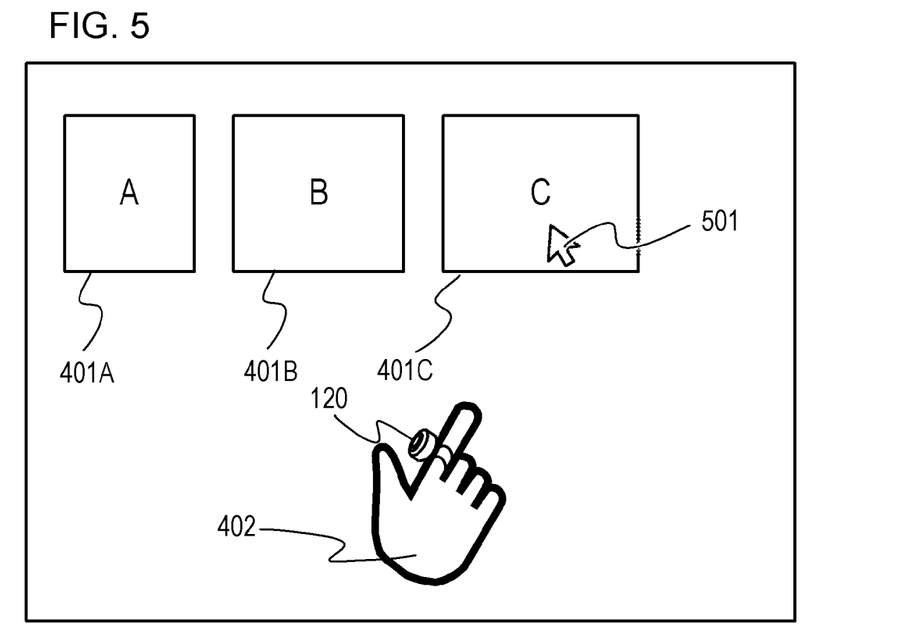
FIG. 5 is a diagram illustrating display of an OTP control mode according to the first embodiment.

Referring to FIGS. 4 and 5, a description will be given of various processing according to a control mode according to the first embodiment.

FIG. 4 is a diagram illustrating display in a ray control mode (first control mode) according to the first embodiment. Note that the ray control mode is a control mode in which a ray (virtual light beam) is controlled according to the inertial information (at least either one of the position and attitude) of the controller 120. The ray mentioned herein is the display item indicating the position specified by the user in a display region of the HMD 100.

FIG. 4 schematically illustrates the display region (composite image) in the image display unit 203 of the HMD 100. The HMD 100 displays the scenery around the HMD 100 (scenery photographed by the image capturing unit 202). As illustrated in FIG. 4, a background includes a hand 402 of the user. The HMD 100 can combine a screen similar to a desktop screen of a general PC with the background showing the scenery. This screen is referred to as a "wide area desktop".

The "wide area desktop" displayed on the HMD 100 allows the user to perform various tasks using the HMD 100 without using a large-size PC monitor connected to the image processing apparatus 110 (such as a PC) or the like. In addition, on the HMD 100, the display region spans the entire field of view of the user, and therefore it is also possible to display an image with a resolution that is difficult to achieve on a real PC monitor and simultaneously display a plurality of images arranged side by side.

It is assumed hereinbelow that the "wide area desktop" is displayed on the display region of the HMD 100 and that the user is simultaneously performing a plurality of tasks. In addition, on the HMD 100, a plurality of windows 401A to 401C are displayed as if floating in space. Specifically, as illustrated in FIG. 4, a window 401A, a window 401B, and a window 401C are displayed side by side. For example, in the window 401A, the user can allow an Internet browser to operate and allow a search result to be displayed. In the window 401B, the user can produce a written text (document). In the window 401C, the user can reproduce a video or allow a music player to operate and reproduce music.

Note that the controller 120 is worn on a finger (index finger) of the hand 402 of the user. From the index finger, a ray 403 (light beam) is displayed as CG to extend in a direction indicated by the index finger. When the controller 120 moves, the attitude sensor unit 224 acquires new inertial information herein, and the inertial information is sent from the controller control unit 221 to the control unit 211. Then, the control unit 211 controls the display of the ray on the basis of the inertial information.

FIG. 5 is a diagram illustrating display in an OTP control mode (second control mode) according to the first embodiment. The OTP control mode is a control mode in which a mouse cursor is controlled according to an operation (hereinafter referred to as the "OTP operation") performed on the OTP. The mouse cursor mentioned herein is a display item indicating a position specified by the user or the like in a specified area (area in each of the windows) of the display region of the HMD 100.

FIG. 5 illustrates the display region (composite image) of the image display unit 203, similarly to FIG. 4. The HMD 100 displays the "wide area desktop". An example in which the user finely controls a position of a mouse cursor 501 in the window 401C will be described herein. In the window 401C, a music player is displayed, and music can be reproduced by the user. To reproduce or fast-forward a music piece, the user selects a button icon in the music player. The user can also select, in a playlist, a music piece to choose the music piece the user likes to listen to.

When music reproduction is performed using the window 401C in a state where the window 401A and the window 401B are displayed, the window 401C is displayed on a partial area of the display region of the image display unit 203. In the area of the window 401C, an area where button icons and selection targets are displayed is further limited. Accordingly, when moving the mouse cursor 501 in the area where the button icons and the selection targets are displayed, the user is required to finely specify a position. Consequently, the mouse cursor 501 two-dimensionally moves in the window 401C according to an operation (hereinafter referred to as the "slide operation") of, e.g., tracing a surface of the OTP of the controller 120. This allows the user to finely specify the position of the mouse cursor 501.

Note that, by changing the position or attitude of the controller 120, the ray is controlled. As a result, when a position of a leading end of the ray is to be significantly moved, it is highly possible that the ray can move as intended by the user but, when the position of the leading end of the ray is to be moved over an extremely small distance, the position of the leading end of the ray may deviate from an intended position. In addition, when the position of the leading end of the ray is close to the user's hand, the position can be controlled rather finely but, when the ray is long and the window is displayed at a position distant from the user's hand, it is difficult to perform extremely fine control of the position. Accordingly, when the position is to be finely specified in the window 401C, the user more easily specifies the position in the OTP control mode than in the ray control mode.

Mode Switching Processing

Figure 3:
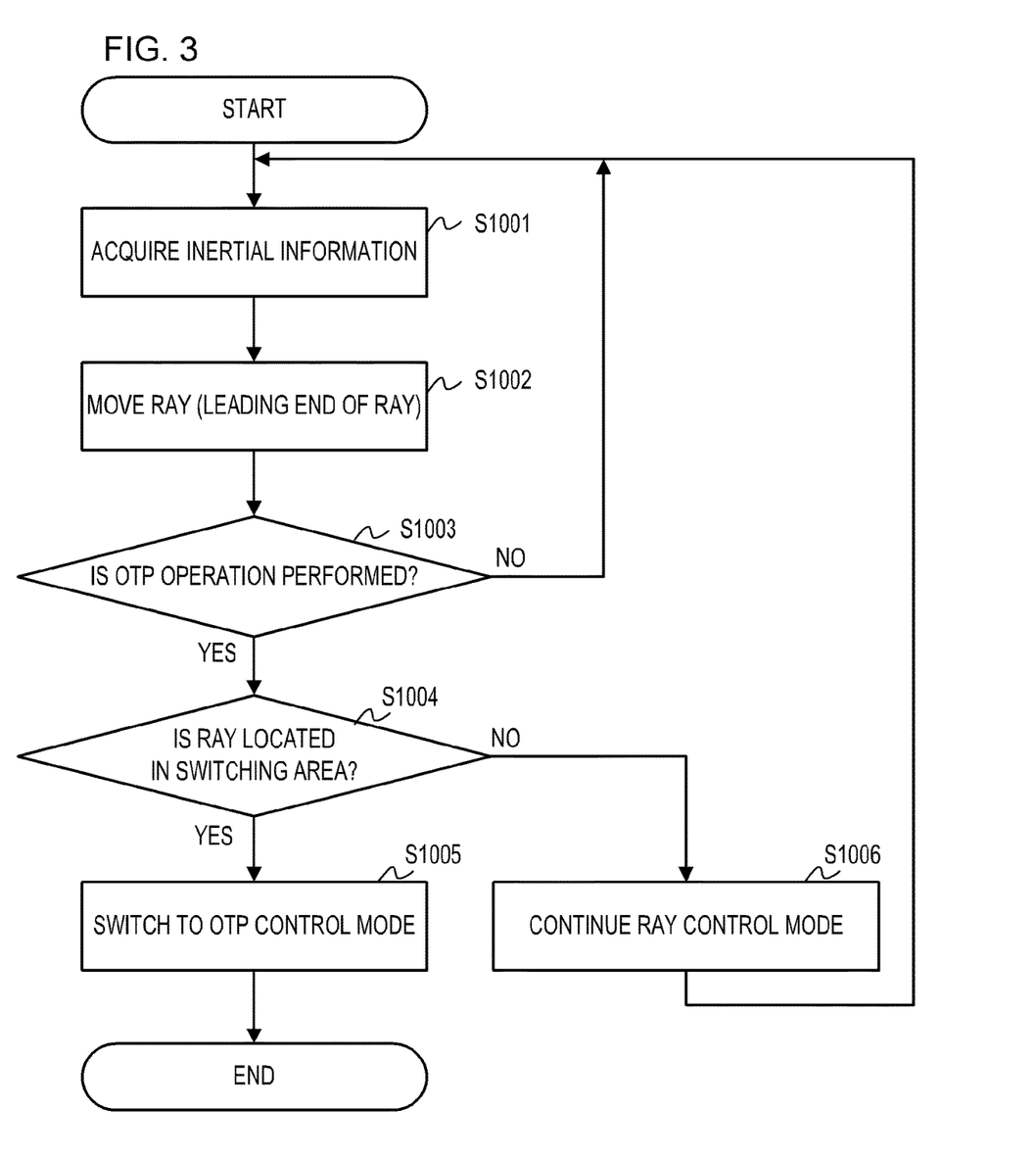
FIG. 3 is a flow chart of mode switching processing according to the first embodiment.

Referring to a flow chart in FIG. 3, a description will be given of processing of switching the ray control mode to the OTP control mode. It is assumed that, at a time when the flow chart in FIG. 3 is started, a composite image as illustrated in FIG. 4 is displayed. It is also assumed that, at the time when the flow chart in FIG. 3 is started, the control mode is set to the ray control mode, and the ray is displayed on the display region of the image display unit 203.

In Step S1001, the control unit 211 acquires the inertial information (information on the attitude and position of the controller 120) detected by the attitude sensor unit 224 (IMU) of the controller 120.

In Step S1002, the control unit 211 moves the ray on the basis of the inertial information. Specifically, the control unit 211 determines, on the basis of the inertial information, a position indicated by the index finger of the user's hand, and moves the position of the leading end of the ray to the position indicated by the index finger of the user's hand.

In Step S1003, the control unit 211 determines whether or not the OTP operation has been performed by the user. When it is determined that the OTP operation has been performed, the processing advances to Step S1004. When it is determined that the OTP operation has not been performed, the processing returns to Step S1001.

The OTP operation may be not only the slide operation performed on the OTP, but also a tap operation such as tapping of the surface of the OTP, an operation of pushing a push button configured integrally with the OTP, or the like. In other words, the OTP operation may be any operation using the OTP. Note that, when an operation for moving the mouse cursor (such as the slide operation) is performed as the OTP operation in the OTP control mode, the operation is particularly convenient due to operation continuity from the ray control mode.

In Step S1004, the control unit 211 determines whether or not the leading end of the ray is located in a switching area. In the example in FIG. 4, the switching area corresponds to the windows 401A to 401C of the display region of the image display unit 203. When it is determined that the leading end of the ray is located in the switching area, the processing advances to Step S1005. When it is determined that the leading end of the ray is not located in the switching area, the processing advances to Step S1006.

In Step S1005, the control unit 211 switches the control mode to the OTP control mode. Then, the control unit 211 causes the mouse cursor to be displayed at the position of the leading end of the ray to hide the ray. As a result, at the switching of the control mode, the position indicated by the display items (the leading end of the ray and the mouse cursor) that specify the position does not change, and therefore it is possible to inhibit the user from losing sight of the mouse cursor.

Note that the control unit 211 may also cause the mouse cursor to be displayed at a position (predetermined position) determined in advance instead of causing the mouse cursor to be displayed at the position of the leading end of the ray. For example, when the music player is activated, the control unit 211 displays the mouse cursor on a reproduction button or, as long as the subsequent operation is clear, the control unit 211 displays the mouse cursor at a position according to the subsequent operation. This may improve an operability of the user. Meanwhile, even in such a case where document production is resumed and characters are input to a position where previous document production has stopped, it may be more convenient to display the mouse cursor at the same position as that in the previous document production than at the position of the leading end of the ray. Note that, depending on details or a situation of the operation performed by the user, an optimum position of the mouse cursor differs. The control unit 211 may also display the mouse cursor at different positions depending on the situation or the like.

In Step S1006, the control unit 211 ignores the OTP operation, and continues the ray control mode (does not switch the control mode). By performing such processing in Step S1006, when the user unintentionally touches the OTP, it is possible to inhibit unneeded switching of the control mode.

In the flow chart in FIG. 3, when the OTP operation is performed in a case where the leading end of the ray is located in the switching area, the ray control mode switches to the OTP control mode. However, in a case where the leading end of the ray is located in the switching area, when an operation of intentionally selecting the switching area (window) is performed and then the OTP operation different from this operation is further performed, the ray control mode may also switch to the OTP control mode. Addition of the operation of intentionally selecting the switching area can reduce a possibility of switching to the OTP control mode against the intention of the user. The "operation of intentionally selecting the switching area" may also be an operation of shaking the controller 120 (operation of causing the controller 120 to perform tapping motion) or an operation of touching the OTP in the ray control mode. Alternatively, the "operation of intentionally selecting the switching area" may also be an operation different from each of an operation for controlling the ray and the OTP operation.

Figure 6:
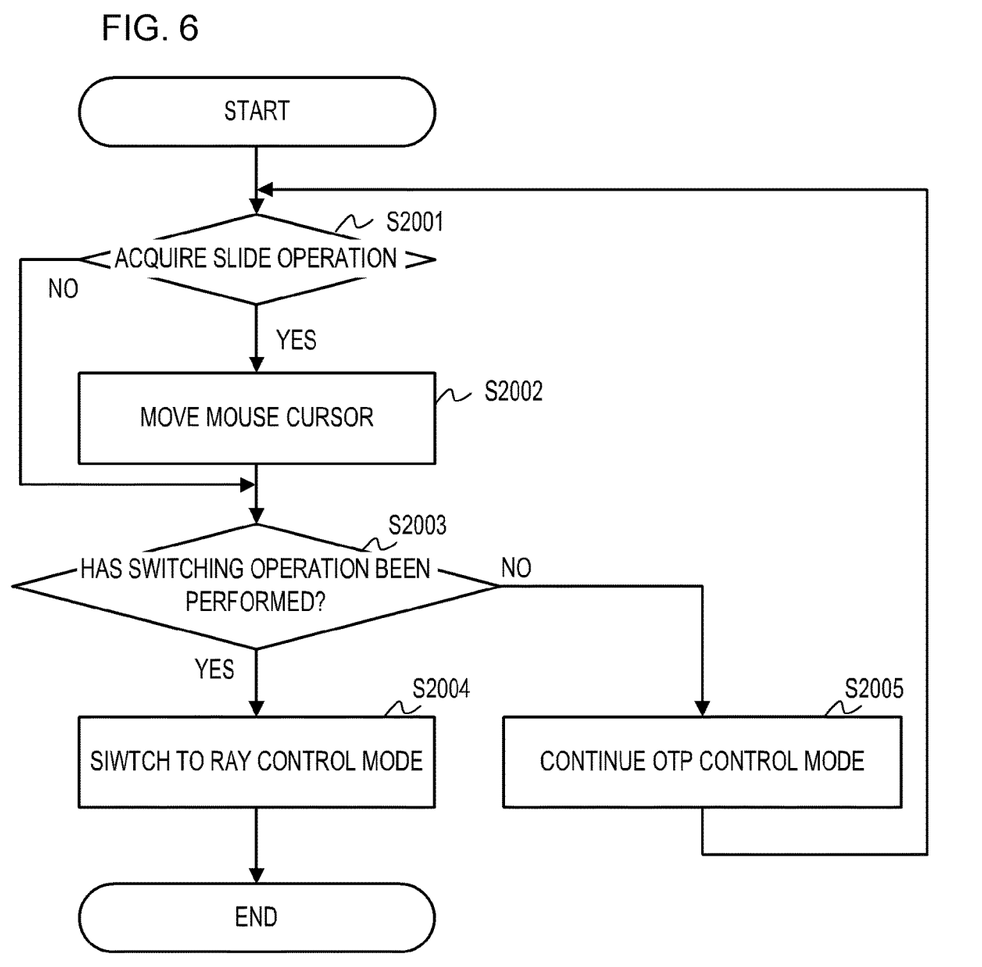
FIG. 6 is a flow chart of the mode switching processing according to the first embodiment.

Next, referring to a flow chart in FIG. 6, processing of switching the OTP control mode to the ray control mode will be described. Basically, the mouse cursor indicates only a position in one of the windows 401A to 401C. Accordingly, even in a case where the user likes to select another window 401A in a state where the mouse cursor is displayed in the window 401C in the OTP mode, the mouse cursor does not reach the window 401A. As a result, the user needs to temporarily switch the display item from the mouse cursor to the ray and then select the window 401A. In addition, since the possibility is high that a relative distance between the individual windows 401A to 401C is long, specifying a position using the ray offers an advantage of high user convenience. Note that the display area of each of the windows 401A to 401C is represented by a two-dimensional plane in a three-dimensional space, and consequently a depth is fixed.

In Step S2001, the control unit 211 determines whether or not information on the slide operation performed on the OTP has been acquired. Then, when it is determined that the information on the slide operation has been acquired, in Step S2002, the control unit 211 moves the mouse cursor according to the information on the slide operation. When it is determined that the information on the slide operation has not been acquired, the processing advances to Step S2003.

In Step S2003, the control unit 211 determines whether or not "an operation (switching operation) for switching the control mode from the OTP control mode to the ray control mode" has been performed. When it is determined that the switching operation has been performed, the processing advances to Step S2004. When it is determined that the switching operation has not been performed, the processing advances to Step S2005.

For example, the switching operation is an operation of moving the controller 120 or the user's hand (changing the position or attitude of the controller 120 or the user's hand) so as to satisfy a specified condition. For example, the switching operation is an operation of swiftly changing an orientation of the controller 120 at once in such a manner as to twist a wrist, an operation of continuously shaking the controller 120, or the like. Alternatively, the switching operation may also be such a hand gesture as to change the hand into a specified shape. In other words, the switching operation needs only to be an operation which is different from the OTP operation (such as the slide operation) and which is not performed in the OTP control mode.

In Step S2004, the control unit 211 switches the control mode to the ray control mode to display the ray such that the leading end of the ray is located at the position indicated by the mouse cursor. Then, the control unit 211 hides the mouse cursor. In Step S2005, the control unit 211 ignores the switching operation and continues the OTP control mode (does not switch the control mode).

Thus, according to the first embodiment, when, in the ray control mode, the OTP operation is performed in a state where the leading end of the ray is located inside of the window (switching area), the ray control mode is switched to the OTP control mode corresponding to a control mode in which a position is specified by the OTP operation. Then, the user controls the mouse cursor by the OTP operation inside of the window to allow fine position specification. As a result, according to the first embodiment, it is possible to control the plurality of display items (the ray and the mouse cursor) each indicating the position and highly convenient for the user.

Note that, in the description given above, the example in which the attitude sensor unit 224 has the IMU has been described, but it is only required to be able to acquire information (such as information on a specified position or an attitude) for specifying the position. For example, the attitude sensor unit 224 may also have a camera (camera mounted in the HMD 100) that determines an origin position and an acceleration sensor. Alternatively, the attitude sensor unit 224 may have only a camera and detect the attitude of the controller 120 using the camera.

Note that the switching area may also be a specified area (menu area, an OK button area, or a pop-up area) of the windows 401A to 401C. Alternatively, instead of the ray, a pointer displayed at a position corresponding to the leading end of the ray may also be used.

First Modification

Figure 7:
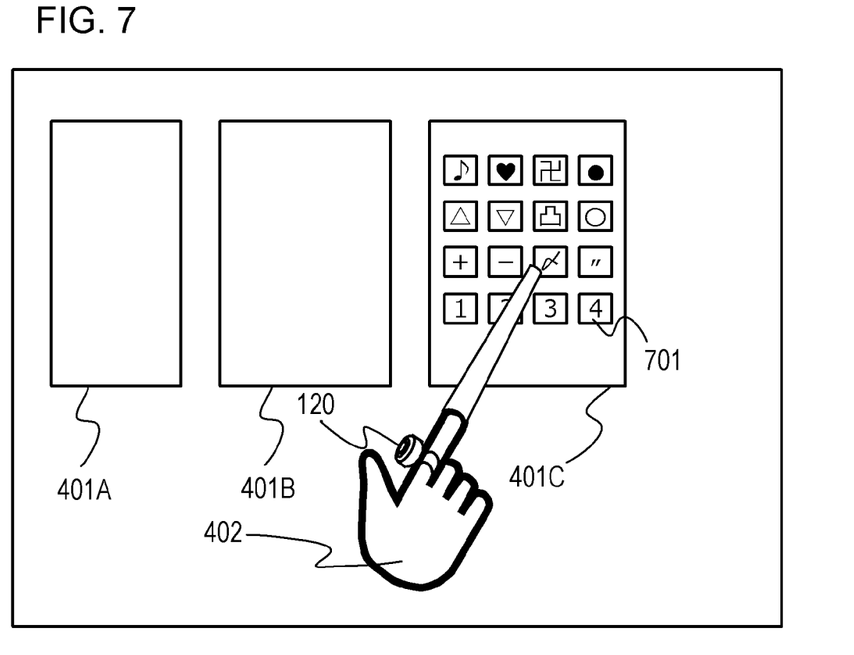
FIG. 7 is a diagram illustrating the display of the ray control mode according to a first modification.
Figure 8:
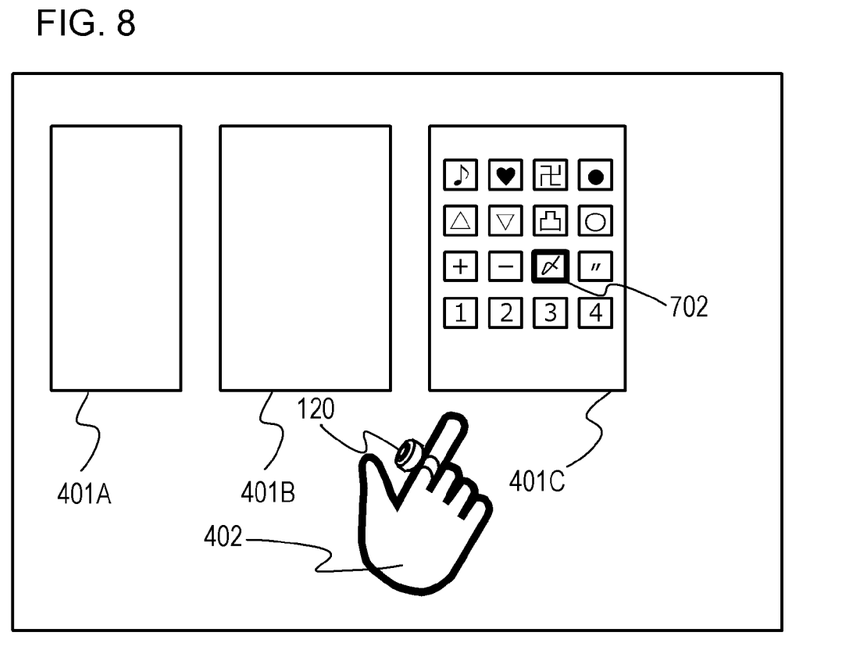
FIG. 8 is a diagram illustrating the display of the OTP control mode according to the first modification.

Referring to FIGS. 7 and 8, a description will be given of the HMD 100 according to a first modification. In the first modification, an example in which, instead of the mouse cursor, a thick frame indicating the selected icon is used will be described.

FIG. 7 illustrates the display region of the HMD 100 in the ray control mode. On the display region, the window 401A, the window 401B, and the window 401C are displayed. In the first modification also, the switching area is the windows 401A to 401C. In the area of the window 401C, a plurality of icons 701 are arranged as on a screen of a smartphone or a tablet. When the one icon 701 is determined from among the plurality of icons 701, an application represented by the determined icon 701 is activated. Note that the window 401C may also be a menu screen (screen which allows functions to be selected and set) on which character information is displayed side by side instead of the icons 701.

As illustrated in FIG. 7, when the leading end of the ray moves so as to be located in the window 401C and then the OTP operation is performed, the ray control mode switches to the OTP control mode, and a composite image as illustrated in FIG. 8 is displayed.

FIG. 8 illustrates a state where the icon 701 located at the leading end of the ray is accentuatedly displayed by a thick frame 702 (display item). Note that the icon 701 may also be accentuatedly displayed (hover-displayed) by being displayed so as to float forward instead of being encircled in the thick frame 702 (displayed distinguishably from the other icons 701). There is a case where intervals between the icons 701 are small, and it is difficult to precisely select one of the icons 701 with the ray. Accordingly, when the leading end of the ray is located in the window 401C, the control unit 211 switches the control mode to the OTP control mode according to the OTP operation. Then, the control unit 211 displays the thick frame 702 to accentuatedly display the icon 701.

In addition, in the OTP control mode, every time the OTP operation is performed (e.g., every time a specified OTP button is pressed), the control unit 211 moves the thick frame 702 indicating the selected icon 701 to the immediately adjacent icon 701. Thus, even when the sizes of the icons 701 are small, the user can precisely select the intended icon 701. Even when the sizes of the icons 701 are large, the user can move the thick frame 702 to the immediately adjacent icon 701 by one operation, and can therefore move straight the thick frame 702 to the intended icon 701.

Second Modification

Figure 9:
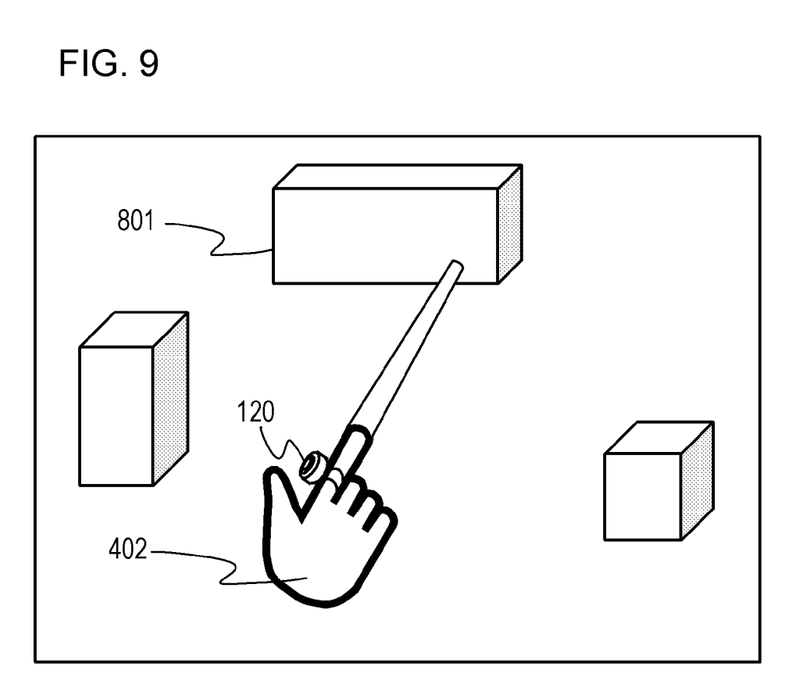
FIG. 9 is a diagram illustrating the display of the ray control mode according to a second modification.
Figure 10:
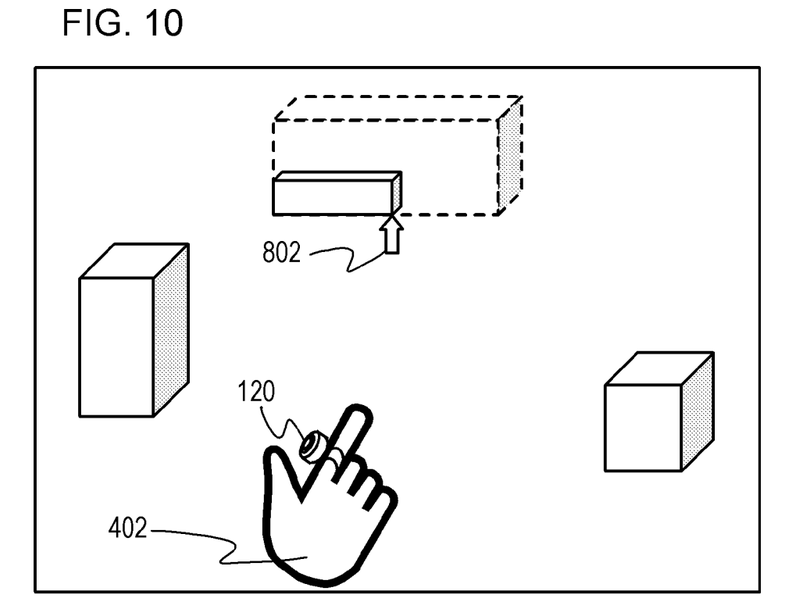
FIG. 10 is a diagram illustrating the display of the OTP control mode according to the second modification.

Referring to FIGS. 9 and 10, a description will be given below of the HMD 100 according to the second modification. In the second modification, an example in which a CG is displayed instead of the windows, and icons are used instead of the mouse cursor will be described.

FIG. 9 illustrates the display region of the HMD 100 (image display unit 203) in the ray control mode. In the display region of the image display unit 203, three cuboid CGs 801 are displayed. In the second modification, it is assumed herein that the switching area is not the "windows" according to the first embodiment, but the "CGs". In FIG. 9, one of the cuboid CGs 801 is indicated by the ray. Then, when the OTP operation is performed in this state, the control mode is switched to the OTP mode, and a composite image as illustrated in FIG. 10 is displayed.

In the OTP control mode, the user performs the OTP operation to be able to enlarge or reduce the CGs 801. For example, when the slide operation is performed in a right direction, the control unit 211 enlarges the CGs 801 while, when the slide operation is performed in a left direction, the control unit 211 reduces the CGs 801.

Thus, it is possible to switch the control mode and enlarge the CGs by the OTP operation, and therefore, by indicating the CG 801 with the ray, it is possible to continuously perform control of the size of the CG 801. In addition, since the size of the CG 801 located at the leading end of the ray changes, the user need not move a line of sight and does not lose sight of the operation target.

Note that, in the OTP control mode, the control unit 211 causes an arrow-shaped icon 802 indicating the size of the CG 801 to be displayed. However, it may also be possible that the control unit 211 does not cause the arrow-shaped icon 802 to be displayed, and treats a line (vertical line indicated by the icon 802) at an end of the CG 801 or a side surface of the CG 801 as the display item (display item specifying the position). In this case, the control unit 211 may also display the line at the end of the CG 801 in a display mode different from those of other lines. For example, the control unit 211 may also cause the line at the end of the CG 801 to blink or to be displayed in a color different from those of the other lines.

Third Modification

Figure 11:
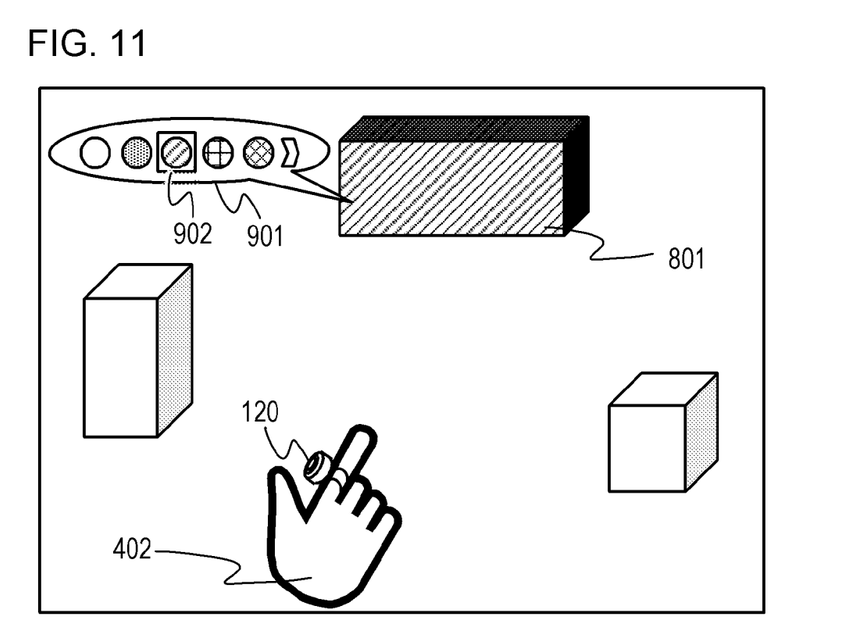
FIG. 11 is a diagram illustrating the display of the OTP control mode according to a third modification.

Referring to FIG. 11, a description will be given below of the HMD 100 according to a third modification. It is assumed that, in the ray control mode, the display region of the HMD 100 displays the ray or the CG 801 illustrated in FIG. 9, in the same manner as in the second modification. In a state where the leading end of the ray is located on the CG 801 as illustrated in FIG. 9, when the OTP operation is performed, the control mode switches to the OTP control mode, and a composite image as illustrated in FIG. 11 is displayed.

FIG. 11 illustrates the display region of the HMD 100 in the OTP control mode. In FIG. 11, according to the OTP operation, a color and a pattern of a surface of the CG 801 are controlled. Then, a color pallet 901 representing candidates for the pattern and color is displayed adjacent to the CG 801. When the pattern and color are selected by the OTP operation, the control unit 211 reflects details of the selection on the display of the CG 801. In the third modification, when the OTP operation is performed, the control unit 211 moves a quadrilateral frame 902 indicating the selected pattern instead of the mouse cursor in the color pallet 901 (region where the color pallet 901 is displayed).

According to the present invention, it is possible to control a plurality of display items each indicating a position and highly convenient for the user.

In the foregoing, "when A is equal to or more than B, advance to Step S1 and, when A is smaller (lower) than B, advance to Step S2" may also be read as "when A is larger (higher) than B, advance to Step S1 and, when A is equal to or less than B, advance to Step S2". Conversely, "when A is larger (higher) than B, advance to Step S1 and, when A is equal to or less than B, advance to Step S2" may also be read as "when A is equal to or more than B, advance to Step S1 and, when A is smaller (lower) than B, advance to Step S2". Accordingly, as long as no contradiction arises, wording "equal to or more than A" may be replaced with "equal to or larger (higher, longer, or more) than A" or may also be read as or replaced with "larger (higher, longer, or more) than A". Meanwhile, wording "equal to or less than A" may be replaced with "equal to or smaller (lower, shorter, less) than A" or may also be replaced with or read as "smaller (lower, shorter, less) than A". In addition, wording "larger (higher, longer, or more) than A" may also be read as "equal to or more than A", while "smaller (lower, shorter, less) than A" may also be read as "equal to or less than A".

While the present invention has been described in detail on the basis of the preferred embodiments thereof, the present invention is not limited to these specified embodiments, and include various modes within a scope not departing from the gist of this invention. It may also be possible to combine portions of the embodiments described above as appropriate.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-128583, filed on Aug. 12, 2022, which is hereby incorporated by reference herein in its entirety.

What is claimed is:

1. An information processing apparatus comprising:
    at least one processor; and
    at least one memory storing a program which, when executed by the at least one processor, causes the information processing apparatus to
    perform first control, in a first control mode, so that a first display item is displayed on a display region of a display, the first display item indicating a position based on inertial information of a controller;
    perform second control, in a second control mode, so that a second display item is displayed on the display region, the second display item indicating a position according to a first operation performed on a specified operation member, the position being in a first area of the display region; and
    perform switching from the first control mode to the second control mode in response to a specified operation in a case where the position indicated by the first display item is included in a second area of the display region in the first control mode.

2. The information processing apparatus according to claim 1,
    wherein, in a case where the switching from the first control mode to the second control mode is performed, the second control is performed to display the second display item on the display region so that the second display item indicates the position indicated by the first display item.

3. The information processing apparatus according to claim 1,
wherein, in a case where the switching from the first control mode to the second control mode is performed, the second control is performed to display the second display item on the display region so that the second display item indicates a predetermined position in the first area.

4. The information processing apparatus according to claim 1,
wherein the first operation is an operation of tracing a surface of the specified operation member.

5. The information processing apparatus according to claim 1,
wherein the specified operation is an operation to the specified operation member.

6. The information processing apparatus according to claim 1,
wherein, in a case where the position indicated by the first display item is not included in the second area in the first control mode, even if the specified operation is performed, the switching from the first control mode to the second control mode is not performed.

7. The information processing apparatus according to claim 1,
wherein, in a case where the position indicated by the first display item is included in the second area in the first control mode,
even if the specified operation is performed before an operation of selecting the second area, the switching from the first control mode to the second control mode is not performed, and
if the specified operation is performed after an operation of selecting the second area, the switching from the first control mode to the second control mode is performed.

8. The information processing apparatus according to claim 1,
wherein, in a case where a second operation different from each of the first operation and the specified operation is performed in the second control mode, the switching from the second control mode to the first control mode is performed.

9. The information processing apparatus according to claim 8,
wherein the second operation is an operation of moving the controller or a hand of a user to satisfy a specified condition.

10. The information processing apparatus according to claim 1,
wherein the first display item is a ray, and
wherein the position indicated by the first display item is a position of a leading end of the ray.

11. The information processing apparatus according to claim 1,
wherein the specified operation includes an operation common to the first operation.

12. The information processing apparatus according to claim 1,
wherein the first area includes an area common to the second area.

13. The information processing apparatus according to claim 1,
wherein the specified operation is a same operation as the first operation.

14. The information processing apparatus according to claim 1,
wherein the first area is a same area as the second area.

15. An information processing method, comprising:
a first display control step of performing control, in a first control mode, so that a first display item is displayed on a display region of a display, the first display item indicating a position based on inertial information of a controller;
a second display control step of performing control, in a second control mode, so that a second display item is display on the display region, the second display item indicating a position according to a first operation performed on a specified operation member, the position being in a first area of the display region; and
a switching step of performing switching from the first control mode to the second control mode in response to a specified operation in a case where the position indicated by the first display item is included in a second area of the display region in the first control mode.

16. A non-transitory computer readable medium that stores a program, wherein the program causes a computer to execute an information processing method, the information processing method comprising:
a first display control step of performing control, in a first control mode, so that a first display item is displayed on a display region of a display, the first display item indicating a position based on inertial information of a controller;
a second display control step of performing control, in a second control mode, so that a second display item is display on the display region, the second display item indicating a position according to a first operation performed on a specified operation member, the position being in a first area of the display region; and
a switching step of performing switching from the first control mode to the second control mode in response to a specified operation in a case where the position indicated by the first display item is included in a second area of the display region in the first control mode.

* * * * *